US007431257B1

(12) United States Patent
Davis et al.

(10) Patent No.: US 7,431,257 B1
(45) Date of Patent: Oct. 7, 2008

(54) FOLDABLE PAINTING STAND

(76) Inventors: Dave Davis, 5101 College Blvd., #5300, Farmington, NM (US) 87401; M. Shane Davis, 5101 College Blvd., #5300, Farmington, NM (US) 87401

( * ) Notice: Subject to any disclaimer, the term of this patent is extended or adjusted under 35 U.S.C. 154(b) by 202 days.

(21) Appl. No.: 11/055,207

(22) Filed: Feb. 10, 2005

(51) Int. Cl.
*F16M 11/38* (2006.01)

(52) U.S. Cl. ........................ 248/431; 248/436; 108/118

(58) Field of Classification Search ................. 248/431, 248/436, 440.1, 440; 108/118, 157.17, 115, 108/119, 145; 5/620, 98.2, 99.1, 98.3; 211/60.1, 211/49.1, 200; D6/475
See application file for complete search history.

(56) References Cited

U.S. PATENT DOCUMENTS

| | | | | |
|---|---|---|---|---|
| 1,724,215 | A * | 8/1929 | Moran | 248/164 |
| 3,797,695 | A * | 3/1974 | Law | 297/188.1 |
| 3,994,400 | A | 11/1976 | Graber | |
| 4,029,318 | A * | 6/1977 | Boss | 273/390 |
| 4,131,205 | A | 12/1978 | Malecki | |
| 4,290,532 | A | 9/1981 | Reynolds | |
| 4,297,795 | A | 11/1981 | Licari | |
| 4,538,365 | A | 9/1985 | Aho | |
| 4,705,247 | A | 11/1987 | Delmerico | |
| 4,789,070 | A | 12/1988 | Bennett | |
| 4,823,965 | A | 4/1989 | Hughes | |
| 4,974,525 | A * | 12/1990 | Sheffield | 108/118 |
| 5,199,930 | A | 4/1993 | Weber | |
| 5,496,094 | A * | 3/1996 | Schwartzkopf et al. | 297/45 |
| 5,934,641 | A * | 8/1999 | Vince | 248/431 |
| 6,499,705 | B1 | 12/2002 | Tsai | |
| 2003/0024886 | A1 | 2/2003 | Belle | |
| 2004/0135041 | A1 * | 7/2004 | Tucker | 248/150 |

* cited by examiner

*Primary Examiner*—Gwendolyn Baxter
(74) *Attorney, Agent, or Firm*—Jeffrey A. Proehl; Woods, Fuller, Shultz & Smith, PC

(57) ABSTRACT

A painting stand for supporting articles to be painted. The painting stand includes a pair of bow members being for selectively supporting the articles to be painted. One of the bow members is operationally coupled to the other one of the bow members whereby the bow members are actuatable between a deployed position and a storage position. The deployed position is defined by one of the bow members is positioned at angle to the other one of the bow members to selectively support the articles. The storage position is defined by one of the bow members is positioned substantially adjacent to the other one of the bow members to facilitate storage of the bow members. A pair of extension members are operationally coupled to the bow members whereby each of the extension members extends from one of the bow members to the other one of the bow members. The extension members maintain the bow members at the desired angle when the bow members are in the deployed position.

15 Claims, 3 Drawing Sheets

FOLDABLE PAINTING STAND

BACKGROUND OF THE INVENTION

1. Field of the Invention

The present invention relates to drying racks and more particularly pertains to a new painting stand for supporting articles to be painted.

2. Description of the Prior Art

The prior art contains many examples of drying racks, U.S. Pat. No. 4,789,070 teaches the retracing line to be positioned along the top of the beams and therefore requires the materials being positioned across the beams to be positioned on the retracting line. U.S. Pat. No. 4,538,365 teaches a screen extending between the rails and placing the screen in a position that may hinder articles being positioned on the rails. U.S. Pat. No. 4,823,965 teaches a flexible band that extends between the first and second upper links where the flexible band is used to support items between the first and second upper links. U.S. Pat. No. 4,131,205

The painting stand according to the present invention substantially departs from the conventional concepts and designs of the prior art, and in so doing provides an apparatus primarily developed for the purpose of supporting articles to be painted.

SUMMARY OF THE INVENTION

In view of the foregoing disadvantages inherent in the known types of drying racks now present in the prior art, the present invention provides a new painting stand construction wherein the same can be utilized for supporting articles to be painted.

To attain this, the present invention generally comprises a pair of bow members for selectively supporting the articles to be painted. One of the bow members is operationally coupled to the other one of the bow members whereby the bow members are actuatable between a deployed position and a storage position. The deployed position is defined by one of the bow members is positioned at angle to the other one of the bow members to selectively support the articles. The storage position is defined by one of the bow members is positioned substantially adjacent to the other one of the bow members to facilitate storage of the bow members. A pair of extension members are operationally coupled to the bow members whereby each of the extension members extends from one of the bow members to the other one of the bow members. The extension members maintain the bow members at the desired angle when the bow members are in the deployed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant feature of the present invention is the mounting of the extension members down on the side portions of the bow members to inhibit the extension members from inadvertently contacting the articles on the bow members that are being painted, as well as positioning the extension members between the pivot pins and the top portion of each of the bow members to position the extension members in a location less likely to be inadvertently contacted by the user and thereby accidentally toppling the bow members Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
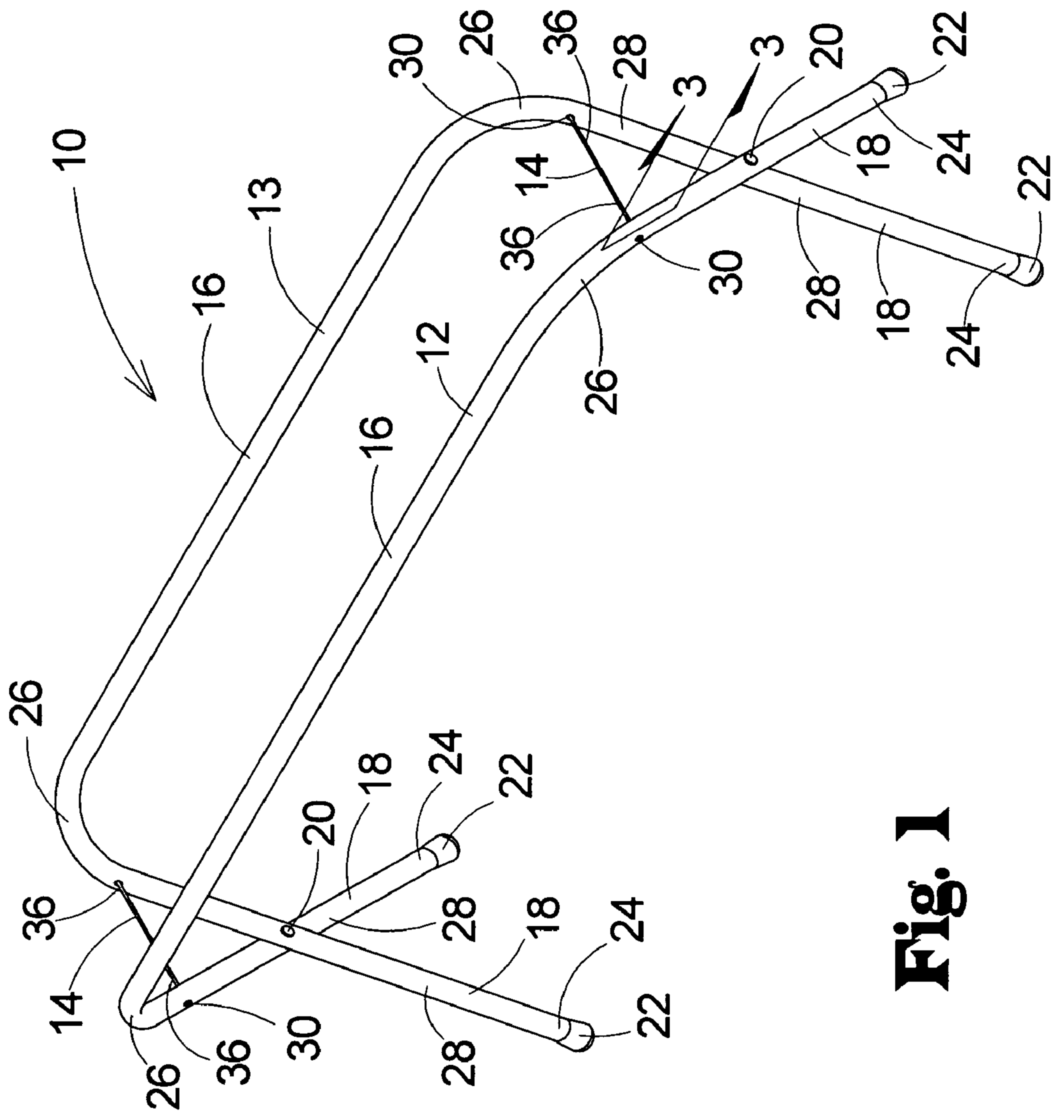
FIG. 1 is a perspective view of a new painting stand according to the present invention shown in the deployed position.
Figure 2:
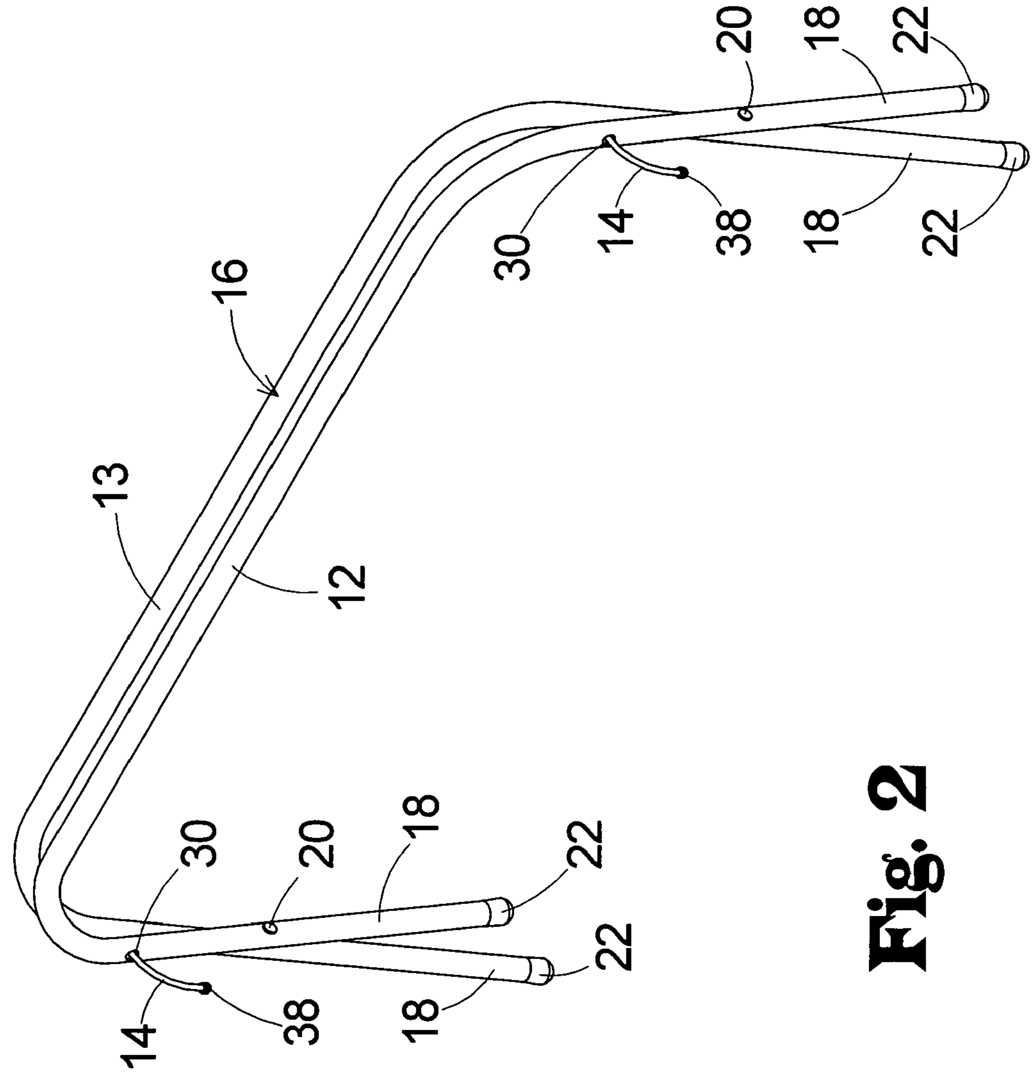
FIG. 2 is a perspective view of the present invention shown in the storage position.
Figure 3:
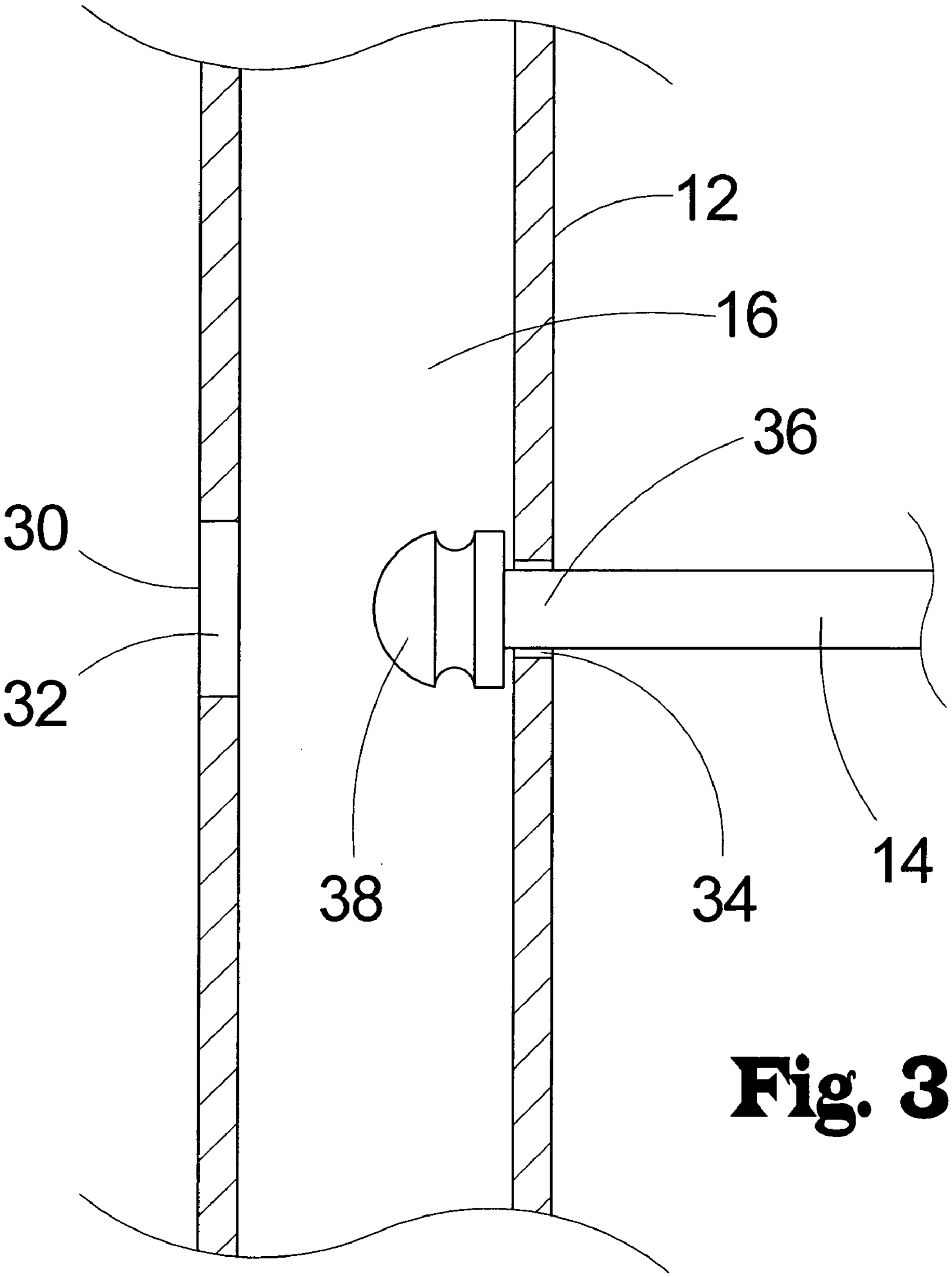
FIG. 3 is a cross-sectional view of one of the apertures of the bow members and stoppers of the extension members of the present invention as taken along line 3-3 of FIG. 1.

With reference now to the drawings, and in particular to FIGS. 1 through 6 thereof, a new painting stand embodying the principles and concepts of the present invention and generally designated by the reference numeral 10 will be described.

As best illustrated in FIGS. 1 through 6, the painting stand 10 generally comprises a pair of bow members 12, 13 for selectively supporting the articles to be painted. One 12 of the bow members is pivotally coupled to the other one 13 of the bow members so that the bow members 12, 13 are pivotable between a deployed position, see FIG. 1, and a storage position, see FIG. 2. The deployed position is defined by one 12 of the bow members being positioned at angle to the other one 13 of the bow members 12, 13 to selectively support the articles. The storage position is defined by one 12 of the bow members being positioned substantially adjacent to the other one 13 of the bow members in collapsed configuration to facilitate storage of the bow members 12, 13. Illustratively, each of the bow members 12, 13 may have a height of about 35¼ inches and a length of about 57 inches.

A pair of extension members 14 are operationally coupled to the bow members 12, 13 so that each of the extension members 14 extends from one 12 of the bow members to the other one 13 of the bow members. The extension members 14 maintain the bow members 12, 13 at the desired angle when the bow members 12, 13 are in the deployed position.

Each of the bow members 12, 13 comprises a top portion 16 and a pair of side portions 18. The top portion 16 extends between the side portions 18 of the associated one 12 of the bow members to connect the side portions 18. The side portions 18 of each of the bow members 12, 13 engage a support surface to support top portions 16 in a raised position above the support surface. The top portion 16 of each of the bow members 12, 13 supports the articles when the bow members 12, 13 are in the deployed position. Each of the side portions 18 of each of the bow members 12, 13 has a length of about 35¼ inches.

Each of the extension members 14 extends between one of the side portions 18 of one 12 of the bow members and an adjacently positioned one of the side portions 18 of the other one 13 of the bow members. Significantly, the mounting location of the extension members 14 to the side portions 18 is spaced from the top portion 16 to inhibit contact between the extension members 14 and the articles when the bow members 12, 13 are in the deployed position an the articles are resting on the top portion 16. The extension members 14 are for maintaining positioning of the side portions 18 of the bow members 12, 13 when the bow members 12, 13 are in the deployed position.

Each of the side portions 18 of the bow members 12, 13 is pivotally coupled to an adjacently positioned one of the side portions 18 of the other one 13 of the bow members to allow the bow members 12, 13 to pivot between the deployed position and the storage position. The side portions 18 of the bow members 12, 13 are positioned in an X configuration when the bow members 12, 13 are in the deployed position.

A pair of pivot pins 20 are coupled to the bow members 12, 13 for permitting one 12 of the bow members to pivot with respect to the other of the bow members 12, 13. Each of the pivot pins 20 extend through one of the side portions 18 of one 12 of the bow members and the associated one of the side portions 18 of the other one 13 of the bow members to permit the side portions 18 of one 12 of the bow members to pivot with respect to the side portions 18 of the other one 13 of the bow members. Each of the pivot pins 20 may be coupled to the adjacently positioned side portions 18 of the bow members 12, 13 at about 17½ inches from the free end 24 of the side portions 18 of the bow members 12, 13. The pivot pins 20 extend through the side portion of each of the bow members 12, 13 at about half the length of the side portions 18 to allow the side portions 18 to form the X configuration when the bow members 12, 13 are positioned in the deployed position.

Each of a plurality of caps 22 is coupled to a free end 24 of each of the side portions 18 whereby each of the caps 22 is positioned opposite the top portion 16 of the associated one 12 of the bow members. The caps 22 are for engaging the support surface to inhibit slipping of the bow members 12, 13 across the support surface. Each of the caps 22 may comprise a friction enhancing material to inhibit the caps 22 and bow members 12, 13 from inadvertently sliding across the support surface.

Each of the side portions 18 of the bow members 12, 13 comprises a transition portion 26 and a leg portion 28. The transition portion 26 is coupled between the leg portion 28 of the associated one 12 of the bow members and the top portion 16 of the associated one 12 of the bow members. The transition portion 26 is arcuate to provide a smooth transition between the top portion 16 and the leg portion 28 of the associated one of the side portions 18. The leg portion 28 of each of the side portions 18 may have a length of about 29 inches.

Each of the bow members 12, 13 includes a plurality of apertures 30 extending through the associated one 12 of the bow members. Each of the apertures 30 extends through an associated one of the side portions 18 of the associated one 12 of the bow members. Each of the extension members 14 extends through one of the apertures 30 of each of the bow members 12, 13 and are configured so that the bow members 12, 13 may slide along the extension members 14 when the bow members 12, 13 are being pivoted between the deployed position and the storage position. The apertures 30 may be positioned about 31 inches from the free end 24 of the associated one of the side portions 18.

Each of the apertures 30 of each of the bow members 12, 13 comprises a first opening 32 and a second opening 34. The first opening 32 may have a diameter greater than a diameter of the second opening 34 of the associated one of the apertures 30. Ends 36 of each of the extension members 14 extend through the apertures 30 and inhibit the extension members 14 from being withdrawn from the apertures 30 through the second opening 34 of the apertures 30.

Each of the extension members 14 comprises a pair of stoppers 38. The stoppers 38 are coupled to the ends 36 of the associated one of the extension members 14. Each of the stoppers 38 comprises a diameter less than the diameter of the first opening 32 of the associated one of the apertures 30 to allow the stoppers 38 to be drawn into the bow members 12, 13 and to inhibit the stoppers 38 becoming snagged on the user and inadvertently pivoting the bow members 12, 13 between the deployed position and the storage position. The diameter of the stoppers 38 is greater than the diameter of the second opening 34 of the associated one of the apertures 30 to inhibit the extension members 14 from disengaging the bow members 12, 13 when the bow members 12, 13 are pivoted between the storage position and the deployed position.

Each of the extension members 14 comprises a flexible cord. The flexible cord of each of the extension members 14 flexes out from between the bow members 12, 13 to allow for the bow members 12, 13 to minimize the amount of space required for storage when the bow members 12, 13 are actuated between the deployed position and the storage position. The flexibility of the cord of the extension members 14, along with the slidabilty of the extension members 14 with respect to the bow members 12, 13, allow the bow members 12, 13 to collapse into the storage position with out the extension members 14 trying to push the bow members 12, 13 apart.

In use, the user pivots the bow members 12, 13 with respect to each other into the deployed position. As the bow members 12, 13 are positioned in the deployed position the stoppers 38 of the extension members 14 are drawn through the first opening 32 of the apertures 30 to secure the stoppers 38 in the side portions 18 of the bow members 12, 13 to inhibit the stoppers 38 being inadvertently snagged and causing the bow members 12, 13 to be pivoted to the storage position. The articles to be painted are then positioned on the top portion 16 of each of the bow members 12, 13 to allow the articles to be easily painted. As the extension members 14 are positioned between the side portions 18 of the bow members 12, 13 and are spaced downwardly from a plane formed by the top portios 16 of the bow members 12, 13 in the deployed position, the possibility of the articles coming into contact with the extension members 14 is greatly reduced. When the user is finished using the bow members 12, 13 the bow members 12, 13 are pivoted to the storage position to facilitate storage. The flexibility of the extension members 14, and the ability of the ends 36 of the extension members 14 to slide with respect to the bow members 12, 13 permits the user to easily bring the top portions 16 of the bow members 12, 13 together using only a single hand. Further, the flexible extension members 14 do not lock the bow members 12, 13 into the storage position, so deployment of the bow members 12, 13 can also be a single handed operation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A painting stand for supporting articles to be painted, the painting stand comprising:

a pair of bow members being for selectively supporting the articles to be painted, one of said bow members being operationally coupled to the other one of said bow members such that said bow members are actuatable between a deployed position and a storage position, said deployed position being defined by one of said bow members being positioned at angle to the other one of said bow members to selectively support the articles, said storage position being defined by one of said bow members being positioned substantially adjacent to the other one of said bow members to facilitate storage of said bow members; and a pair of extension members configured to selectively maintain said bow members at a desired angle when said bow members are in said deployed position, each said extension member of said pair of extension members being coupled to each of said bow members such that each of said extension members extends from one of said bow members to the other one of said bow members;

wherein each said extension member is slidably mounted to at least one of said bow members;

wherein each said extension member is slidable through an aperture in one of said bow members; and wherein each of said extension members comprises a flexible cord, said flexible cord of each of said extension members flexing out from between said bow members to allow for said bow members to minimize the amount of space required for storage when said bow members are actuated between said deployed position and said storage position;

wherein each of said bow members comprises a top portion and a pair of side portions, said top portion extending between said side portions of the associated one of said bow members to connect said side portions for supporting the articles when said bow members are in said deployed position, said side portions supporting said top portion in a raised condition above a support surface when rested on the support surface; and wherein each of said side portions of said bow members is pivotally coupled to an adjacently positioned one of said side portions of the other one of said bow members to allow said bow members to pivot between said deployed position and said storage position, said side portions of said bow members being positioned in an X configuration when said bow members are in said deployed position.

2. The painting stand as set forth in claim 1, wherein each of said extension members extends between said side portions of said bow members at a location spaced from said top portion to inhibit contact between said extension members and the articles when said bow members are in said deployed position.

3. The painting stand as set forth in claim 1, further comprising:

a pair of pivot pins being coupled to said bow members for permitting one of said bow members to pivot with respect to the other of said bow members, each of said pivot pins extending through one of said side portions of one of said bow members and the associated one of said side portions of the other one of said bow members to permit said side portions of one of said bow members to pivot with respect to said side portions of the other one of said bow members.

4. The painting stand as set forth in claim 3, wherein said pivot pins extend through said side portion of each of said bow members at about half the length of said side portions to allow said side portions to form the X configuration when said bow members are positioned in said deployed position.

5. The painting stand as set forth in claim 1, further comprising:

a plurality of caps for engaging the support surface to inhibit slipping of said bow members across the support surface, each of said caps being coupled to a free end of each of said side portions such that each of said caps is positioned opposite said top portion of the associated one of said bow members.

6. The painting stand as set forth in claim 1, wherein each of said side portions of said bow members comprise a transition portion and a leg portion, said transition portion being coupled between said leg portion of the associated one of said bow members and said top portion of the associated one of said bow members, said transition portion being arcuate to provide a smooth transition between said top portion and said leg portion of the associated one of said side portions.

7. The painting stand as set forth in claim 1, wherein each of said extension members extends between said side portions of said bow members at a location spaced from said top portion to inhibit contact between said extension members and the articles when said bow members are in said deployed position;

a pair of pivot pins being coupled to said bow members for permitting one of said bow members to pivot with respect to the other of said bow members, each of said pivot pins extending through one of said side portions of one of said bow members and the associated one of said side portions of the other one of said bow members to permit said side portions of one of said bow members to pivot with respect to said side portions of the other one of said bow members;

wherein said pivot pins extend through said side portion of each of said bow members at about half the length of said side portions to allow said side portions to form the X configuration when said bow members are positioned in said deployed position;

a plurality of caps for engaging the support surface to inhibit slipping of said bow members across the support surface, each of said caps being coupled to a free end of each of said side portions such that each of said caps is positioned opposite said top portion of the associated one of said bow members; and wherein each of said side portions of said bow members comprise a transition portion and a leg portion, said transition portion being coupled between said leg portion of the associated one of said bow members and said top portion of the associated one of said bow members, said transition portion being arcuate to provide a smooth transition between said top portion and said leg portion of the associated one of said side portions.

8. A painting stand for supporting articles to be painted, the painting stand comprising:

a pair of bow members being for selectively supporting the articles to be painted, one of said bow members being operationally coupled to the other one of said bow members such that said bow members are actuatable between a deployed position and a storage position, said deployed position being defined by one of said bow members being positioned at angle to the other one of said bow members to selectively support the articles, said storage position being defined by one of said bow members being positioned substantially adjacent to the other one of said bow members to facilitate storage of said bow members; and a pair of extension members maintaining said bow members at a desired angle when said bow members are in said deployed position, said pair of extension members being operationally coupled to said bow members such that each of said extension members extends from one of said bow members to the other one of said bow members;

wherein each of said bow members comprises a plurality of apertures extending through the associated one of said bow members, each of said extension members extending through one of said apertures of each of said bow members such that said bow members may slide along said extension members when said bow members are being actuated between said deployed position and said storage position;

wherein each of said apertures of each of said bow members comprises a first opening and a second opening, said first opening having a diameter greater than a diameter of said second opening of the associated one of said apertures, ends of each said extension members extending through said apertures and inhibit said extension members from being withdrawn from said apertures through said second opening of said apertures; and wherein each of said extension members includes a pair of stoppers, each of said stoppers being coupled to one of said ends of said extension members, each of said stoppers having a diameter less than said diameter of said first opening of the associated one of said apertures to allow said stoppers to be drawn into said bow members, said diameter of said stoppers being greater than said diameter of said second opening of the associated one of said apertures to inhibit said extension members from disengaging said bow members when said bow members are actuated between said storage position and said deployed position.

9. A painting stand for supporting articles to be painted, the painting stand comprising:

a pair of bow members being for selectively supporting the articles to be painted, a first one of said bow members being pivotably coupled to a second one of said bow members such that said bow members are pivotable between a deployed position and a storage position, said deployed position being defined by said first bow member being positioned at angle to said second bow member to selectively support the articles, said storage position being defined by said first bow member being positioned substantially adjacent to said second bow member to facilitate storage of said bow members; and a pair of extension members configured to selectively maintain said bow members at a desired angle when said bow members are in said deployed position, each said extension member of said pair of extension members being coupled to each of said bow members such that each of said extension members extends from one of said bow members to the other one of said bow members;

wherein each of said bow members comprises a top portion and a pair of side portions, said top portion extending between said side portions of the associated one of said bow members to connect said side portions for supporting the articles when said bow members are in said deployed position, said side portions supporting said top portion in a raised condition above a support surface when rested on the support surface, said side portions of each said bow member comprising a first side portion and a second side portion;

wherein a first one of said extension members comprises a flexible cord connected to the first side portion of said first bow member and connected to the first side portion of said second bow member, a second one of said extension members comprising a flexible cord connected to the second side portion of said first bow member and the second side portion of said second bow member; and wherein each of said apertures of each of said bow members comprises a first opening and a second opening, said first opening having a diameter greater than a diameter of said second opening of the associated one of said apertures, ends of each said extension members extending through said apertures and inhibit said extension members from being withdrawn from said apertures through said second opening of said apertures.

10. The painting stand as set forth in claim 9, wherein each said extension member is slidably mounted to one of the side portions of at least one of said bow members.

11. The painting stand as set forth in claim 9, wherein each said extension member is slidable through an aperture in one side portion of said bow members.

12. The painting stand as set forth in claim 9, wherein each of said extension members extends between said side portions of said bow members at a location spaced from said top portion to inhibit contact between said extension members and the articles when said bow members are in said deployed position.

13. The painting stand as set forth in claim 9, wherein each of said side portions of said bow members is pivotally coupled to an adjacently positioned one of said side portions of the other one of said bow members to allow said bow members to pivot between said deployed position and said storage position, said side portions of said bow members being positioned in an X configuration when said bow members are in said deployed position.

14. The painting stand as set forth in claim 9, wherein each of said bow members comprises a plurality of apertures extending through the associated one of said bow members, each of said extension members extending through one of said apertures of each of said bow members such that said bow members may slide along said extension members when said bow members are being actuated between said deployed position and said storage position.

15. The painting stand as set forth in claim 9, wherein each of said extension members includes a pair of stoppers, each of said stoppers being coupled to one of said ends of said extension members, each of said stoppers having a diameter less than said diameter of said first opening of the associated one of said apertures to allow said stoppers to be drawn into said bow members, said diameter of said stoppers being greater than said diameter of said second opening of the associated one of said apertures to inhibit said extension members from disengaging said bow members when said bow members are actuated between said storage position and said deployed position.

* * * * *